(No Model.)
G. DUNCAN & J. R. EVENS.
STALK CUTTER.
No. 281,621. Patented July 17, 1883.
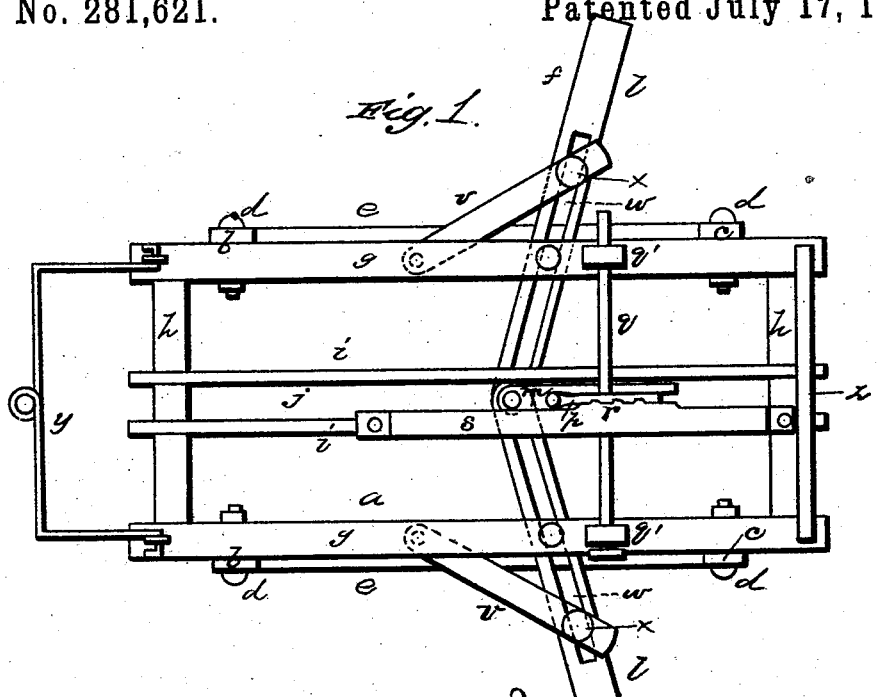
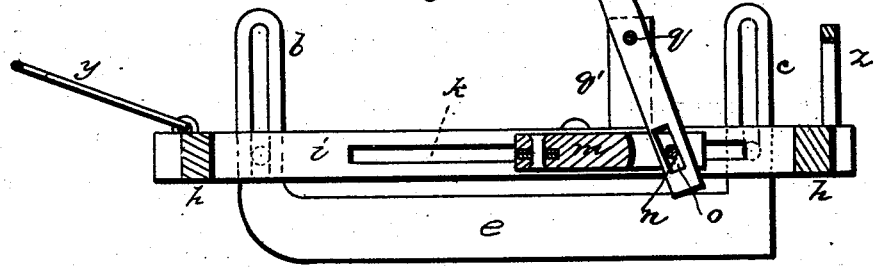
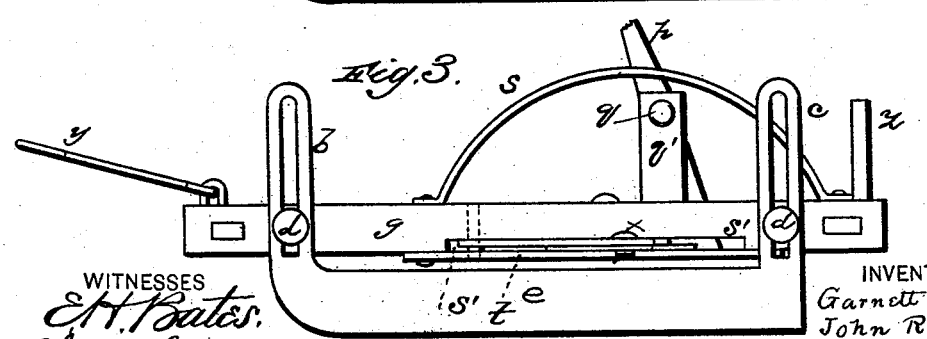
WITNESSES
INVENTORS
Garnett Duncan
John R. Evens
By Anderson & Smith
their ATTORNEYS

UNITED STATES PATENT OFFICE.

GARNETT DUNCAN AND JOHN R. EVENS, OF GAINESVILLE, TEXAS, ASSIGNORS OF ONE-THIRD TO J. J. HAIGHT AND W. P. CUNNINGHAM, OF SAME PLACE.

STALK-CUTTER.

SPECIFICATION forming part of Letters Patent No. 281,621, dated July 17, 1883.

Application filed April 3, 1883. (No model.)

*To all whom it may concern:*

Be it known that we, GARNETT DUNCAN and JOHN R. EVENS, citizens of the United States, residing at Gainesville, in the county of Cooke and State of Texas, have invented certain new and useful Improvements in Stalk-Cutters; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a top view of our cutter. Fig. 2 is a vertical sectional view of the same, and Fig. 3 is a side view.

This invention has relation to stalk-cutters for cutting cotton and cornstalks; and the improvement consists in the novel construction and arrangement of parts, as will be hereinafter fully described and specifically claimed.

Referring by letter to the accompanying drawings, $a$ designates the frame, secured to the vertically-slotted standards $b$ and $c$ of the runners $e$ $e$ by bolts and nuts $d$, so as to be vertically adjustable therein, in order to regulate the height of the knives or cutters $f$, hereinafter explained. The frame $a$ is composed of the side sills, $g$, connected near each end by cross-sills $h$, preferably by mortise-and-tenon joints, as shown, and the cross-sills $h$ are connected about midway of their length by two parallel bars, $i$ $i$, having a space, $j$, between them, as shown. These parallel bars $i$ $i$ are provided with elongated lateral slots $k$ for the passage of the inner ends of the slotted knives $f$ $f$ to their pivotal point on the forward end of the sliding block $m$ in the space $j$. The rear end of the block $m$ is bifurcated, and the arms of said bifurcation are perforated laterally for the reception of a pin, $n$, passed transversely through a slot, $o$, in the lower end of a lever, $p$, fulcrumed to a rod, $q$, supported in standards $q'$ $q'$, rising from the side sills of the main frame, near its rear end, as shown. The upper end of this lever $p$ is adapted to engage any one of a series of notches, $r$, in a vertically-bowed rack, $s$, secured to one of the parallel bars $i$ $i$. The side sills, $g$, are recessed in their under faces, as shown at $s'$, and are faced by plates $t$, leaving spaces for the knives $f$ $f$ to be adjusted on their pivot-bolts. Arms $v$ are pivoted at their forward ends in the recesses $s'$, and extend rearwardly at an angle, and are connected at their rear ends with the slots $w$ of the pivoted knives $l$ $l$ by a screw-stud, $x$, as shown.

$y$ designates the draft-bail to which the team is attached, and $z$ designates a handle by which the operator controls the direction of the machine. The runners herein shown are preferably of iron. It is obvious, however, that wheels may be employed instead of runners to support the frame, and that the frame may be adjusted in the slotted standards thereof. It is furthermore obvious that the sliding block may be moved forward and backward in its guideways and locked in position by the lever and rack, so that the angle of the pivoted slotted knives can be varied, and they may be made to cut at a greater or less width, as may be desired.

Having thus fully described our invention, what we claim, and desire to secure by Letters Patent, is—

In a stalk-cutter, the combination of the frame $a$, having the central longitudinal parallel bars, $i$ $i$, slotted laterally at $k$, and having the space $j$ between them, the sliding block $m$, pivoted slotted knives $f$ $f$, pivoted arms $v$, and recessed side sills, $g$ $s'$, and the pivoted lever $p$, and rack $s$, substantially as specified.

In testimony whereof we affix our signatures in presence of two witnesses.

GARNETT DUNCAN.
JOHN RICHARD EVENS.

Witnesses:
J. A. LANDIS,
A. B. DUNCAN.